United States Patent
Gillet et al.

(10) Patent No.: US 11,066,524 B2
(45) Date of Patent: Jul. 20, 2021

(54) PROCESS FOR PRODUCING ALKOXYLATED POLYPHENOLS

(71) Applicant: Arkema France, Colombes (FR)

(72) Inventors: Jean-Philippe Gillet, Brignais (FR); Jean-François Devaux, Soucieu en Jarrest (FR); Philippe Leduc, Larajasse (FR)

(73) Assignee: Arkema France, Colombes (FR)

( * ) Notice: Subject to any disclaimer, the term of this patent is extended or adjusted under 35 U.S.C. 154(b) by 18 days.

(21) Appl. No.: 16/338,819

(22) PCT Filed: Oct. 3, 2017

(86) PCT No.: PCT/FR2017/052721
§ 371 (c)(1),
(2) Date: Apr. 2, 2019

(87) PCT Pub. No.: WO2018/065727
PCT Pub. Date: Apr. 12, 2018

(65) Prior Publication Data
US 2019/0248961 A1 Aug. 15, 2019

(30) Foreign Application Priority Data

Oct. 4, 2016 (FR) ...................................... 1659587

(51) Int. Cl.
| | | |
|---|---|---|
| C07G 1/00 | (2011.01) | |
| C08H 7/00 | (2011.01) | |
| C08G 18/64 | (2006.01) | |
| B01F 17/00 | (2006.01) | |
| C08G 63/66 | (2006.01) | |
| D01F 9/17 | (2006.01) | |

(52) U.S. Cl.
CPC ............ C08H 6/00 (2013.01); B01F 17/0028 (2013.01); C08G 18/6492 (2013.01); C08G 63/66 (2013.01); D01F 9/17 (2013.01); *C08G 2110/0025* (2021.01)

(58) Field of Classification Search
CPC ........ C08G 18/6492; C08G 2101/0025; C07G 1/00; C08H 8/00; C08H 6/00
See application file for complete search history.

(56) References Cited

U.S. PATENT DOCUMENTS

| | | | |
|---|---|---|---|
| 3,654,194 A | | 4/1972 | Christian et al. |
| 5,230,814 A | * | 7/1993 | Naae .................. C09K 8/584 |
| | | | 166/270.1 |
| 6,100,385 A | * | 8/2000 | Naae .................... C07G 1/00 |
| | | | 530/502 |
| 2014/0014524 A1 | * | 1/2014 | Swanger ................ C09D 5/00 |
| | | | 205/317 |
| 2014/0200324 A1 | | 7/2014 | Bassi et al. |
| 2015/0038665 A1 | | 2/2015 | Bassi et al. |
| 2020/0032002 A1 | * | 1/2020 | Gillet ................... C08L 97/005 |

FOREIGN PATENT DOCUMENTS

| | | |
|---|---|---|
| DE | 19648724 A1 | 5/1998 |
| EP | 2816052 A1 | 12/2014 |
| WO | 2013113462 A1 | 8/2013 |
| WO | 2015083092 A1 | 6/2015 |

OTHER PUBLICATIONS

Carolina Andreia Cateto et al., "Optimization Study of Lignin Oxypropylation in View of the Preparation of Polyurethane Rigid Foams," 48 Ind. Eng. Chem. Res. 2583 (2009).*
International Search Report and Written Opinion for International Application No. PCT/FR2017/052721, dated Dec. 14, 2017, 8 pages.
Cateto, "Lignin-Based Polyurethanes: Characterization Synthesis and Applicatuions", 2008, 258 pages.

* cited by examiner

*Primary Examiner* — Nicholas E Hill
(74) *Attorney, Agent, or Firm* — RatnerPrestia

(57) ABSTRACT

The invention relates to a process for producing at least one alkoxylated polyphenol comprising the following successive steps:
(a) reacting at least one polyphenol, at least one alkoxylating agent, at least one catalyst, in the presence of at least one alkoxylated polyphenol as a solvent, the polyphenol/polyphenol alkoxylated weight ratio as a solvent being less than 2, preferably less than or equal to 1.5, more preferably less than or equal to 1, even more preferably less than or equal to 0.5; and
(b) removing the residual alkoxylating agent.

12 Claims, No Drawings

PROCESS FOR PRODUCING ALKOXYLATED POLYPHENOLS

CROSS-REFERENCE TO RELATED APPLICATIONS

This is the national phase of International Application No. PCT/FR2017/052721, filed Oct. 3, 2017, which claims priority to French Application No. 1659587, filed Oct. 4, 2016. The disclosure of each of these applications is incorporated herein by reference in its entirety for all purposes.

FIELD OF THE INVENTION

The invention relates to a production process for alkoxylated polyphenols, more specifically, alkoxylated lignins.

BACKGROUND OF THE INVENTION

Lignin is one of the main components of wood, along with cellulose and hemicellulose. After cellulose, lignin is the most abundant biopolymer on Earth. It ensures the rigidity of wood by interpenetrating the cellulose network while conferring resistance to water and some wood pests.

Although abundant, it should be noted that lignin is under-valued as such. Until now, and even till this day, the primary valorisation of lignin is energy valorisation, particularly through the burning of black liquors. This valorisation is important for the economic balance of pulp mills. However, due to the drop in pulp production and lignin surpluses, work is being done for better valorisation of lignin.

Interest in the use of lignin has therefore grown over the last few years. One area in which the properties of lignin are exploited is the reinforcement of a multitude of polymers, especially urethane-based polymers. Indeed, lignin can be used for the manufacture of polyurethane foam derivatives. Since lignin is a polyphenol, it has a large number of alcohol functional groups capable of reacting, for example with isocyanates to form the polyurethane derivatives. However, since these alcohol functions are difficult to access within this polyphenol, it is necessary to carry out a propoxylation reaction of these functions beforehand, leading to less congested alcohol functions (further from the polyphenol nucleus), and thereby more accessible.

In general, the process used by various authors consists firstly in a propoxylation of lignin by reacting lignin with propylene oxide in the presence of a catalyst and then reacting the obtained product with, for example, isocyanate.

Regarding the lignin propoxylation step, the authors usually operate in autoclaves or Parr bombs. All lignin, for example kraft lignin, is loaded with propylene oxide and a basic catalyst in adequate proportions under a nitrogen atmosphere. The reactor is then closed and heated.

The reaction is initiated around 150° C. with a strong exothermicity that causes a sudden rise in temperature to 250° C. and pressure from a few bars to more than 20 bars. The authors believe that the reaction is complete when the pressure and temperature decrease and reach a stable level.

Given the strong exothermicity of the reaction, the authors must ensure strict control of the reaction conditions for safety reasons. The current process is therefore not industrially transferable.

According to the thesis entitled "Lignin-based Polyurethanes: Characterization, Synthesis and Applications" Borges Cateto, (2008), lignin, propylene oxide and a catalyst are introduced into a reactor which is closed and which is then heated to 160° C. The pressure and temperature increase to a maximum which depends on a number of parameters. Propoxylated lignin is recovered at the end of the reaction. This document states that the reaction was carried out on 100 g samples.

Furthermore, given the temperature conditions, pressure and the residual presence of water, part of the propylene oxide can be homopolymerised, as mentioned in EP2816052. The propoxylated lignin is then mixed with the poly (propylene) glycols, which cannot be readily separated from the propoxylated lignin.

That being said, some authors have succeeded in overcoming the exothermic control issue as mentioned above. In fact, the patent WO2015/083092 describes a process wherein a solid lignin dispersion is produced in a dispersant, such as polyethylene glycol, di or tetraethylene glycol polyethylene glycol dispersant, followed by the addition of a base. Then, propylene oxide is added continuously.

Nevertheless, the manufactured product is a mixture of propoxylated lignin and dispersant, optionally propoxylated, difficult to separate from the propoxylated lignin. It should also be noted that the reaction times are extremely long.

Similarly, the patent US2015/0038665 discloses a process in which propylene oxide is continuously added to a mixture consisting of lignin, glycerol, lignin polyol and a catalyst. However, this process has a huge disadvantage of leaving a mixture of propoxylated lignin with glycerol or propoxylated glycerol in the finished product.

In addition, it should be noted that the lignin is in solid form. Consequently, it is difficult to use it in the form of a homogeneous reaction medium. It also tends to generate deposits capable of clogging different components of an installation, for example reactors, pipes, valves, ducts, etc. . . . Consequently, it is also difficult to handle on an industrial level.

The above references disclose the suspension of lignin in dispersants, which can solubilise at least some or all of the lignin. However, these processes require subsequent separation steps to isolate the propoxylated lignin from the by-products of reaction of the dispersant with the reactants.

Thus, there is the need for an industrial alkoxylation process, and especially of propoxylation, polyphenols, such as lignin, enabling sufficient solubilisation and leading to a directly usable product, hence, one capable of being directly engaged in the next step, without the need for an intermediate separation step.

SUMMARY OF THE INVENTION

The purpose of the present invention is to propose a solution that would solve all of the above-mentioned problems.

The subject of the invention is a process for producing at least one alkoxylated polyphenol comprising the following successive steps:
  (a) reacting at least one polyphenol, at least one alkoxylating agent, at least one catalyst, in the presence of at least one alkoxylated polyphenol as a solvent, the polyphenol/polyphenol alkoxylated weight ratio as a solvent being less than 2, preferably less than or equal to 1.5, more preferably less than or equal to 1, even more preferably less than or equal to 0.5; and
  (b) removing the residual alkoxylating agent.

The process according to the invention uses alkoxylated polyphenol as reaction solvent, and especially polyphenol. Depending on the amount of solvent used, the reaction medium is heterogeneous or homogeneous, most generally heterogeneous. The use of the alkoxylated polyphenol as a solvent is to solubilise at least part of the polyphenol and to disperse the insolubilized portion of polyphenol. Hence, this specific choice of solvent resolves the problems related to the separation of the alkoxylated polyphenol obtained. The alkoxylated polyphenol obtained by the process according to the invention can be used crude, without any purification other than the elimination of the unreacted alkoxylating agent, and the neutralization of the catalyst.

Furthermore, the process according to the invention has the advantage of synthesizing the alkoxylated polyphenol in good safety conditions, in order to enable the possibility for it to be carried out at an industrial scale. Indeed, the operating conditions in terms of temperature and pressure are controlled by the process according to the invention. The exothermicity of the reaction is mainly controlled by the presence of a solvent partially solubilising the polyphenol and diluting the alkoxylating agent.

Finally, the process according to the invention also has the advantage of not restricting the use of alkoxylating agent to propylene oxide only. Ethylene oxide and/or butylene oxide or mixtures thereof can also be used.

DETAILED DESCRIPTION OF THE INVENTION

It should be noted that the expressions "from . . . to . . ." used in the present description must be understood as including each of the mentioned limits. Throughout the text, pressures are expressed in absolute MegaPascals (MPa).

Step (a): The process according to the invention comprises a step (a) reacting at least one polyphenol, at least one alkoxylating agent, at least one catalyst, in the presence of at least one alkoxylated polyphenol as a solvent, the alkoxylated polyphenol/polyphenol weight ratio as a solvent being less than 2, preferably less than or equal to 1.5, more preferably less than or equal to 1, even more preferably less than or equal to 0.5.

Polyphenols: The polyphenols used in the process according to the invention may be selected from natural tannins, lignins and polyphenols other than tannins and lignins, preferably lignins. Advantageously, said polyphenol is a lignin, preferably selected from kraft lignin, lignosulphonates and organosolv lignins.

Kraft lignin is derived from the paper making process of the same name. In terms of chemical structure, kraft lignin is a combination of three phenolic compounds, coumaryl alcohol, coniferyl alcohol and sinapyl alcohol. Examples of kraft lignin suitable for use include inter alia Indulin AT™ marketed by the Ingevity company, the kraft lignin marketed by the Fibria company, or the lignin marketed by the Stora Enso company.

Lignosulphonates differ structurally from kraft lignin by additional generally salified sulfonic functions, which give them better solubility in water. Examples of lignosulfonates include Borresperse™, Ultrazine™, Ufoxane™ or even Vanisperse™ type lignosulfonates.

Organosolv lignins are obtained by chemical etching of woody plants, such as cereal straw, using various solvents, like formic acid or acetic acid. Among the various sources of organosolv lignins is Biolignin™, marketed by CIMV or marketed by the Fibria company. Preferably, the polyphenol used is lignin.

Alkoxylating agents: The alkoxylating agents used in the process according to the invention may be selected from those of formula (I) below:

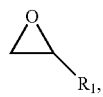

wherein $R_1$ denotes a hydrogen atom or an alkyl radical in $C_1$-$C_6$.

Preferably, $R_1$ denotes a hydrogen atom or an alkyl radical in $C_1$-$C_2$. Thus, the alkoxylating agent is particularly preferably selected from ethylene oxide, propylene oxide, butylene oxide, and mixtures thereof, preferably propylene oxide.

Preferably, the polyphenol/alkoxylating agent weight ratio ranges from 0.05 to 2, preferably from 0.1 to 1, more preferably from 0.15 to 0.9, more preferably from 0.15 to 0.7.

Catalyst: The catalyst used in the process according to the invention may be selected from alkali metal hydroxides, sodium or potassium alkoxides, and tertiary amines selected from trialkylamines and tetramethylguanidine, preferably selected from alkaline metal hydroxides.

More preferably, the catalyst used in the process according to the invention may be selected from lithium hydroxide, sodium hydroxide, potassium hydroxide and caesium hydroxide.

Advantageously, the catalyst represents from 0.01% to 10% weight, preferably from 1 to 6% weight in relation to the weight of polyphenol.

Alkoxylated polyphenol: The alkoxylated polyphenol used as a solvent for the reaction used in the process according to the invention is a solvent of the reagent, polyphenol. Hence, it solubilises at least a portion of the polyphenol. The alkoxylated polyphenol obtained at the end of step (a) is the product of the reaction of a polyphenol and an alkoxylating agent.

Advantageously, the alkoxylated polyphenol as solvent and the alkoxylated polyphenol manufactured according to the process according to the invention are identical or different, preferably identical.

Preferably, said alkoxylated polyphenol as solvent used in step (a) is obtained by reacting polyphenol with the same alkoxylating agent as that used in step (a). This may be selected from ethylene oxide, propylene oxide, butylene oxide and mixtures thereof, in the presence of at least one catalyst.

Advantageously, said alkoxylated polyphenol as a solvent is obtained according to the process according to the invention. When the reaction is carried out batchwise, a portion of the alkoxylated polyphenol produced in one operation may be reused in the next operation. When the reaction is carried out continuously, a portion of the alkoxylated polyphenol product may serve as a solvent for the reaction, which occurs in alkoxylated polyphenol.

The very first batch operation or the start of the continuous reaction may use an alkoxylated polyphenol as a solvent produced by another process than that of the invention. It can be obtained according to any process known to the person skilled in the art, such as that described in the thesis entitled *"Lignin-based Polyurethanes: Characterization, Synthesis and Applications"* Borges Cateto, (2008).

The polyphenol/alkoxylated polyphenol weight ratio as a solvent is less than 2, preferably less than or equal to 1.5, more preferably less than or equal to 1, and even more preferably less than or equal to 0.5. Preferably, the polyphenol/polyoxyalkyleneglycol weight ratio as solvent is greater than or equal to 0.05.

Advantageously, the alkoxylated polyphenol/polyphenol weight ratio as solvent ranges from 0.05 to 0.5, preferably from 0.1 to 0.4, and more preferably from 0.1 to 0.3. Said weight ratio corresponds to the contents of the reagents.

According to a preferred embodiment of the process according to the invention, the alkoxylated polyphenol as solvent constitutes the only solvent of the reaction medium of step (a), hence, that the solvent consists of alkoxylated polyphenol.

Reaction conditions: Step (a) according to the invention can be carried out at a temperature ranging from 70° C. to 200° C., preferably from 70° C. to 170° C., more preferably from 100° C. to 170° C. The reaction pressure may range from 0.1 MPa to 1.8 MPa, and preferably from 0.1 MPa to 0.6 MPa.

Preferably, the duration of step (a) varies from a few minutes to several hours, preferably from 5 minutes to 72 hours, more preferably from 10 minutes to 24 hours, even more preferably from 10 minutes to 12 hours.

Step (b): As indicated above, the process according to the invention comprises a step (b) of removing the residual alkoxylating agent. For the purposes of the present invention, the term "residual alkoxylating agent" refers to an un-reacted alkoxylating agent.

Preferably, said step of removing the residual alkoxylating agent is carried out by cooking, meaning by maintaining a temperature ranging from 70° C. to 170° C., preferably from 70° C. to 130° C. to consume the residual alkoxylating agent, and/or by a stripping step under an inert gas stream. Alternatively, said stripping step may be carried out under steam or under vacuum.

Preferably, after said step (b), the weight content of residual alkoxylating agent is less than or equal to 1% in relation to the weight of alkoxylated polyphenol obtained at the end of step (b), preferably less than or equal to 0.1%, more preferably less than or equal to 0.01%.

The alkoxylated polyphenol obtained is in the form of a dark coloured viscous liquid. The raw product is directly usable as is, for the manufacture of rigid polyurethane foam (PU) derivatives like thermal insulation. For other applications, traces of catalyst can be removed by processes known to the person skilled in the art.

Preferably, the process according to the invention comprises the following successive stages:
(a1) mixing in a reactor at least one polyphenol, at least one alkoxylated polyphenol as a solvent in the aforementioned proportions, and at least one catalyst;
(a2) optionally drying the mixture;
(a3) adding at least one alkoxylating agent to the mixture.

Preferably, the optional step (b) of drying the mixture is carried out by stripping with nitrogen or with steam.

Furthermore, the process can be implemented batchwise, semi-continuously or continuously.

According to a first variant of the process according to the invention, the process according to the invention is a batch or semi-continuous process. In this variant, step (a) can be decomposed into 3 successive steps:
(a1) mixing in a reactor at least one polyphenol, at least one alkoxylated polyphenol as a solvent in the aforementioned proportions, and at least one catalyst;
(a2) optionally drying the mixture;
(a3) adding at least one alkoxylating agent to the mixture in at least one semi continuous step.

The optional step (a2) consists in removing the water possibly formed during the reaction of the catalyst with the polyphenol or brought by the catalyst in aqueous solution. This drying step (a2) can be carried out by hot nitrogen stripping, meaning at a temperature ranging from 50° C. to 130° C., and optionally under reduced pressure between 0.001 MPa and 0.1 MPa.

In step (a3), the reactor is purged with nitrogen. It is pressurized to a pressure ranging from 0.05 to 0.4 MPa, and the reaction mixture is heated with stirring at a temperature ranging from 100 to 160° C.

The alkoxylating agent or the mixture of alkoxylating agents is then introduced semi-continuously at an introduction rate making it possible to control the temperature and the safety pressure. The reaction is generally carried out at a temperature ranging from 70° C. to 200° C. preferably from 100° C. to 170° C. The pressure varies according to the type of reactor and the filling rate of the latter and varies from 0.1 to 1.8 MPa.

At the end of the reaction, step (b) is carried out to remove the residual alkoxylating agent, which consists of consuming the remainder of the alkoxylating agent by maintaining the temperature. There is a drop in pressure until theoretical pressure is reached due to nitrogen alone. It is also possible to carry out a stripping step with an inert gas, such as nitrogen, or with steam and/or under vacuum, to remove the last traces of alkoxylating agent.

A second variant of the process according to the invention is a continuous type process, comprising the following successive stages:
(a1) Mixing in a reactor, at least one polyphenol, at least one alkoxylated polyphenol as a solvent in the proportions mentioned above, and at least one catalyst, said polyphenol, said alkoxylated polyphenol as solvent and said catalyst being added continuously,
(a2) Optionally dry the mixture;
(a3) Add at least one alkoxylating agent in at least one continuous step, while continuously withdrawing the reaction medium.

Step (a1) is carried out by feeding polyphenol, alkoxylated polyphenol as a solvent and catalyst in a reactor. The reactor may be a stirred tank or a mixing device such as an extruder. It is carried out at a temperature of 70° C. to 200° C. The pressure can range from 0.001 MPa to 0.4 MPa, and preferably from 0.001 MPa to 0.1 MPa. This step can be carried out continuously with uninterrupted feeding of the reagents and a continuous withdrawal of the reaction mixture formed.

It can also be performed in batch with a sequential supply of reagents, then a mixing step and a drying step as described in the first variant. The reaction mixture produced can then be continuously sent to step (a3).

In step (a3), the reaction mixture resulting from step (a1) or optionally from step (a2) and at least one alkoxylating agent are continuously added to a reactor system, which may consist of a continuous stirred tank or cascade of continuous stirred tanks or an extruder. Crude alkoxylated polyphenol is withdrawn continuously from the reactor system.

Preferably, step (a3) comprises a cascade of 2 to 6 continuous stirred tanks. The first tank is continuously fed with the reaction mixture from step (a1) or step (a2) and each subsequent tank is continuously fed with the stream withdrawn from the previous tank.

Advantageously, each continuously stirred tank is continuously fed with a portion of the alkoxylating agent flow in order to obtain a tighter polydispersity of alkoxylated polyphenol product.

In the reaction system, the temperature can be maintained between 80 to 200° C., and preferably from 100 to 170° C. and more preferably from 130 to 170° C. The pressure is generally between 0.1 and 1.8 MPa.

At the start of the installation, the reactor of step (a1) and the reactor system of step (a2) may be at least partially filled with at least one alkoxylated polyphenol.

The alkoxylated polyphenol obtained by the process according to the invention can be used as a solvent in a process for producing alkoxylated polyphenols, especially as defined above.

Preferably, the process according to the invention comprises a step (c) of recovering the alkoxylated polyphenol obtained after step (b).

Another purpose of the present invention is an alkoxylated polyphenol obtainable by the process according to the invention.

Another subject of the present invention is the use of alkoxylated polyphenol obtained by the process according to the invention for producing polyurethanes, polyesters, non-ionic or cationic surfactants, biosourced precursors of carbon fibre.

The present invention is further illustrated by the following non-limiting examples.

EXAMPLES

Example 1

Synthesis of a Propoxylated Lignin According to the Invention

In a 6 L autoclave, 500.4 g of propoxylated lignin obtained according to the process described in the aforementioned thesis are added, the operating procedure of which is specified on pages 97 and 98 (see table 4.8 Indulin AT™, formulation 30/70/2 page 122), said process being repeated several times, and 144.8 g of previously dried lignin Indulin AT™.

The weight ratio lignin/propoxylated lignin is 0.29 by weight and the catalyst/lignin weight ratio is 4.5% by weight.

3 purges are successively carried out with nitrogen. Leak tests are also carried out. The temperature under stirring of the reaction medium is gradually increased to 110° C. Nitrogen stripping is carried out at this temperature and at 0.02 MPa to dry the medium for 1 hour. Nitrogen pressure at 0.286 MPa is activated and then a 45 g fraction of propylene oxide is introduced. The temperature is gradually increased to a temperature ranging from 140° C. to 150° C. At 145° C., attachment of the reaction is observed. The entire propylene oxide, i.e. 830 g, is introduced at a temperature of 150° C. and at a maximum pressure of 0.55 MPa at an average flow rate of 200 g/h. The temperature is maintained at 150° C. until a pressure level is reached. At the end of the addition, the mixture is left under stirring for one hour in order for all the propylene oxide to be consumed, the residue is then stripped with nitrogen for 1 hour at 100° C. 1455 g of product are recovered in the form of a dark viscous liquid. The product is homogeneous and does not contain unreacted lignin grain. Its hydroxyl number ($I_{OH}$) is 160 mg of KOH/g.

Example 2

5 successive batches are carried out according to the protocol described in Example 1. The propoxylated lignin used in the first batch is the product obtained in Example 1. Part of the product of each batch constitutes the propoxylated lignin of the following batch.

It is observed that the product of each batch is a homogeneous dark viscous liquid which does not contain unreacted lignin grain.

The invention claimed is:

1. A process for producing at least one alkoxylated polyphenol comprising the following successive steps:
   (a) reacting at least one polyphenol, at least one alkoxylating agent and at least one catalyst in the presence of at least one alkoxylated polyphenol as a solvent,
   wherein the (polyphenol)/(alkoxylated polyphenol as a solvent) weight ratio ranges from 0.05 to 0.5 and the (polyphenol)/(alkoxylating agent) weight ratio ranges from 0.15 to 0.7; and
   (b) removing residual alkoxylating agent.

2. The process according to claim 1, wherein the polyphenol is selected from natural tannins, lignins and polyphenols other than tannins and lignins.

3. The process according to claim 2, wherein the polyphenol is a lignin.

4. The process according to claim 1, wherein the alkoxylating agent has the following formula (I):

wherein $R_1$ denotes a hydrogen atom or an alkyl radical in $C_1$-$C_6$.

5. The process according claim 1, wherein the alkoxylating agent is selected from ethylene oxide, propylene oxide, butylene oxide, and mixtures thereof.

6. The process according to claim 1, wherein the catalyst is selected from alkali metal hydroxides, sodium or potassium alkoxides, and tertiary amines selected from trialkylamines and tetramethylguanidine.

7. The process according to claim 1, wherein the temperature in step (a) ranges from 70° C. to 200° C.

8. The process according to claim 1, wherein the pressure during step (a) ranges from 0.1 to 1.8 MPa.

9. The process according to claim 1, wherein it is carried out batchwise, semi-continuously or continuously.

10. The process according to claim 1, comprising a step (c) of recovering the alkoxylated polyphenol obtained after step (b).

11. The process according to claim 1, wherein the alkoxylated polyphenol produced by the process is identical to the alkoxylated polyphenol used as the solvent.

12. The process according to claim 1, wherein the alkoxylated polyphenol produced by the process is different from the alkoxylated polyphenol used as the solvent.

* * * * *